United States Patent
Suzuki (10) Patent No.: US 8,744,459 B2
(45) Date of Patent: Jun. 3, 2014

(54) COMMUNICATION SYSTEM, SERVICE PROVIDING APPARATUS, RESOURCE MANAGEMENT METHOD AND PROGRAM

(75) Inventor: Takehiro Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 831 days.

(21) Appl. No.: 12/934,042

(22) PCT Filed: Mar. 26, 2009

(86) PCT No.: PCT/JP2009/056042
§ 371 (c)(1),
(2), (4) Date: Sep. 22, 2010

(87) PCT Pub. No.: WO2009/125675
PCT Pub. Date: Oct. 15, 2009

(65) Prior Publication Data
US 2011/0028173 A1    Feb. 3, 2011

(30) Foreign Application Priority Data
Apr. 11, 2008    (JP) .................................. 2008-103550

(51) Int. Cl.
*H04B 7/00*    (2006.01)
(52) U.S. Cl.
USPC .......................... 455/450; 455/509; 370/329
(58) Field of Classification Search
USPC .......................... 455/450–453, 509; 370/329
See application file for complete search history.

(56) References Cited

U.S. PATENT DOCUMENTS 7,848,338 B2 * 12/2010 Bachmutsky ............... 370/401

FOREIGN PATENT DOCUMENTS

| EP | 1770935 A1 | 4/2007 |
| JP | 2008508795 A | 3/2008 |
| WO | 2008038384 A | 4/2008 |

OTHER PUBLICATIONS

Taiwanese Office Action for TW098111386 mailed on Nov. 7, 2012.
International Search Report for PCT/JP2009/056042 mailed Jun. 9, 2009.
WiMAX Forum Network Architecture (Stage 3: Detailed Protocols and Procedures), Release1.1.1, WiMAX Forum Proprietary, Sep. 14, 2007.

* cited by examiner

*Primary Examiner* — Raymond Dean
(74) *Attorney, Agent, or Firm* — Sughrue Mion, PLLC (57) ABSTRACT

When a service providing device which provides a service to a mobile communication terminal enters a service stop mode, a signal indicating that the service stop mode is set in is transmitted to service providing devices other than that service providing device. Upon reception of the signal, the service providing device which has transmitted the signal releases the resource of the mobile communication terminal to which a service has been provided.

8 Claims, 11 Drawing Sheets

| MS identification information | Anchor ASN-GW identification information | Serving ASN-GW identification information | Autheticator ASN-GW identification information |
|---|---|---|---|
| MS 401-1 | ASN-GW 201-1 | ASN-GW 201-2 | ASN-GW 201-3 |
| MS 401-2 | ASN-GW 201-1 | ASN-GW 201-1 | ASN-GW 201-1 |
| MS 401-3 | ASN-GW 201-1 | ASN-GW 201-2 | ASN-GW 201-2 |

Fig.4

| MS identification information | Anchor ASN-GW identification information | Serving ASN-GW identification information | Autheticator ASN-GW identification information |
|---|---|---|---|
| MS 401-1 | ASN-GW 201-1 | ASN-GW 201-2 | ASN-GW 201-3 |
| MS 401-3 | ASN-GW 201-1 | ASN-GW 201-2 | ASN-GW 201-2 |

Fig.5

| MS identification information | Anchor ASN-GW identification information | Serving ASN-GW identification information | Autheticator ASN-GW identification information |
|---|---|---|---|
| MS 401-1 | ASN-GW 201-1 | ASN-GW 201-2 | ASN-GW 201-3 |

COMMUNICATION SYSTEM, SERVICE PROVIDING APPARATUS, RESOURCE MANAGEMENT METHOD AND PROGRAM

TECHNICAL FIELD

The present invention relates to a communication system, service providing apparatus, resource management method and program which provide a plurality of services to a mobile terminal.

BACKGROUND ART

A mobile WiMAX system that applies WiMAX (Worldwide Interoperability for Microwave Access) technology, a recent focus of attention, to mobile communication involves an ASN-GW (Access Service Network Gateway) that is a service providing apparatus for providing services to an MS (Mobile Station) via a BS (Base Station). The ASN-GW is disclosed in Document "WiMAX Forum Network Architecture—Stage 3—Detailed Protocols and Procedures—Release 1.1.1, Sep. 14, 2007" for example. The ASN-GW is provided with three logical functions, namely, a Serving function for managing information of the MS, an Anchor function which serves as a data path enabling the MS to communicate, and an Authenticator function for performing authentication processing of the MS. These functions are to be executed by an ASN-GW connected to a BS to which an MS has entered.

However, there are cases in which a movement of the MS causes the three logical functions described above to be physically distributed over a plurality of ASN-GWs. For example, there are cases where a movement of the MS causes the three logical functions to be distributed over a plurality of ASN-GWs after a handover across a plurality of ASN-GWs (R4 HO: Reference-Point 4 Handover) is performed or after reauthentication subsequent to R4 HO is performed.

As an example, a case will now be cited where the three logical functions with respect to an arbitrary MS (hereinafter referred to as an MSA) are physically distributed across three ASN-GWs (an ASN-GW1 to perform the Serving function, an ASN-GW2 to perform the Authenticator function, and an ASN-GW3 to perform the Anchor function).

In such a circumstance, for example, when the ASN-GW1 enters a service suspended state, services can no longer be provided to the MSA as a WiMAX network. However, the ASN-GW2 and the ASN-GW3 are unable to detect that the ASN-GW1 has fallen into a service suspended state and, accordingly, are equally unable to detect that services can no longer be provided to the MSA. Therefore, regardless of the fact that services can no longer be provided to the MSA as a WiMAX network, the ASN-GW2 and the ASN-GW3 continue to manage information of the MSA. This causes a problem in that resources end up being secured uselessly.

DISCLOSURE OF THE INVENTION

An object of the present invention is to provide a communication system, a service providing apparatus, a resource management method and program which solve the problem described above.

In order to achieve the object described above, in a communication system including a mobile communication terminal provided with a wireless communication function and a plurality of service providing apparatuses providing a plurality of services to the mobile communication terminal via a wireless base station, the service providing apparatus, upon entering a suspended state of the services, transmits a signal indicating that a suspended state of the services has been entered to service providing apparatuses other than said service providing apparatus, and when the signal is received, releases resources of the mobile communication terminal to which the service providing apparatus having transmitted the signal has provided the services.

In addition, a service providing apparatus which, in plurality, provides a plurality of services to a mobile communication terminal provided with a wireless communication function, wherein the service providing apparatus transmits, upon entering a suspended state of the service, a signal indicating that a suspended state of the services has been entered to service providing apparatuses other than said service providing apparatus, and when the signal is received, releases resources of the mobile communication terminal to which the service providing apparatus having transmitted the signal has provided the services.

Furthermore, a resource management method of a service providing apparatus which, in plurality, provides a plurality of services to a mobile communication terminal provided with a wireless communication function, for managing resources of the mobile communication terminal, the resource management method comprising steps for:

transmitting, upon entering a suspended state of the services, a signal indicating that a suspended state of the services has been entered to service providing apparatuses other than said service providing apparatus, and releasing, when the signal is received, resources of the mobile communication terminal to which the services have been provided by the service providing apparatus having transmitted the signal.

Moreover, a program that causes a service providing apparatus which, in plurality, provides a plurality of services to a mobile communication terminal provided with a wireless communication function, to execute procedures for:

transmitting, upon entering a suspended state of the services, a signal indicating that a suspended state of the services has been entered to service providing apparatuses other than the service providing apparatus, and releasing, when the signal is received, resources of the mobile communication terminal to which the services have been provided by the service providing apparatus having transmitted the signal.

As described above, by configuring the present invention so that when a service providing apparatus providing services to a mobile communication terminal enters a suspended state of the services, a signal indicating that a suspended state of the services has been entered is transmitted to service providing apparatuses other than said service providing apparatus, and when the signal is received, the resources of the mobile communication terminal to which the service providing apparatus having transmitted the signal has provided the services are releases, the risk of resource depletion can be reduced.

BEST MODE FOR CARRYING OUT THE INVENTION

An exemplary embodiment of the present invention will now be described with reference to the drawings.

Figure 1:
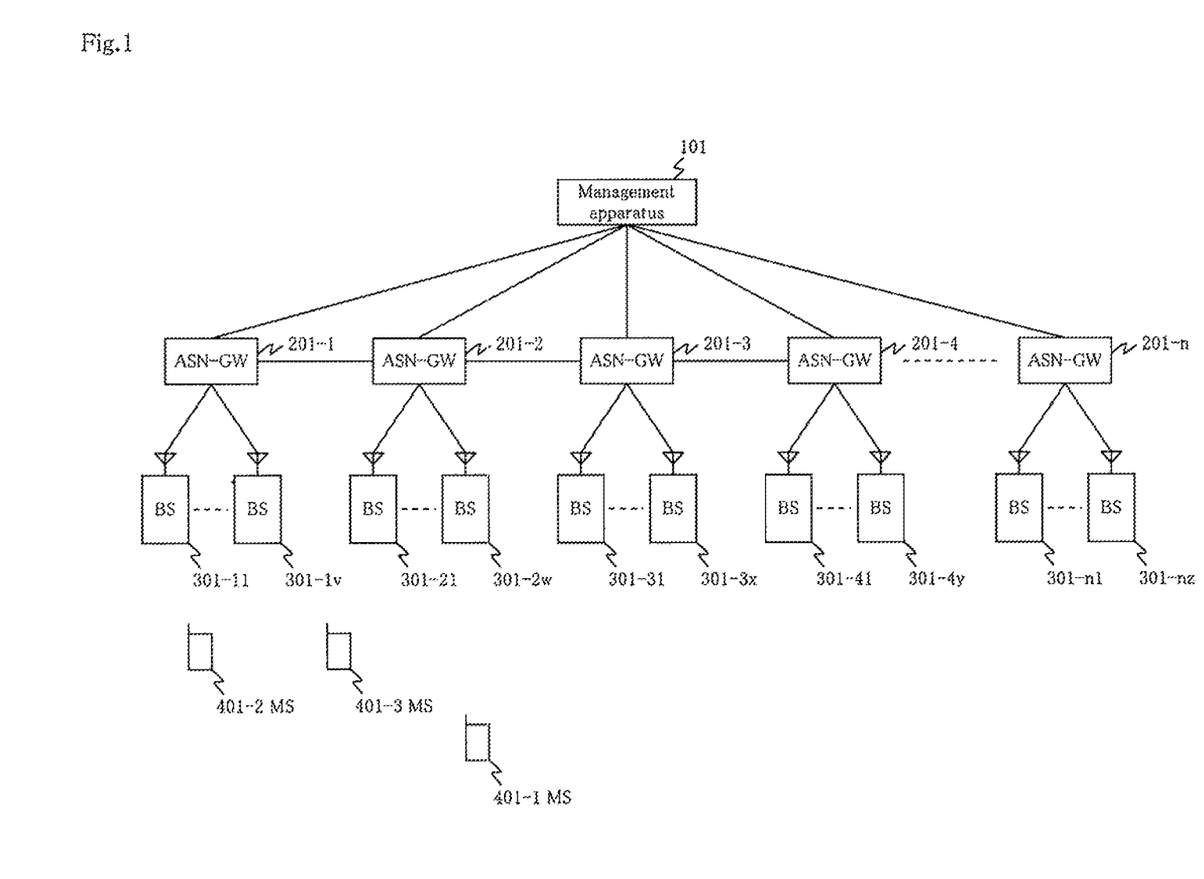
FIG. 1 is a diagram showing an exemplary embodiment of a communication system according to the present invention.

FIG. 1 is a diagram showing an exemplary embodiment of a communication system according to the present invention.

As shown in FIG. 1, the present exemplary embodiment includes: management apparatus 101; ASN-GWs 201-1 to 201-n; BSs 301-11 to 301-1v; BSs 301-21 to 301-2w; BSs 301-31 to 301-3x; BSs 301-41 to 301-4y; and BSs 301-n1 to 301-nz, where n, v, w, x, y and z denote any integers and, in particular, where n denotes any integer equal to or greater than 2. In addition, there exist mobile communication terminals MSs 401-1 to 401-3 provided with wireless communication functions. While FIG. 1 shows a case where there are three MSs 401-1 to 401-3, the numbers thereof are not limited to three.

Management apparatus 101 is connected to and manages ASN-GWs 201-1 to 201-n.

ASN-GWs 201-1 to 201-n are service providing apparatuses provided on a WiMAX network which performs processing on MSs 401-1 to 401-3 via BSs 301-11 to 301-1v, BSs 301-21 to 301-2w, BSs 301-31 to 301-3x, BSs 301-41 to 301-4y, and BSs 301-n1 to 301-nz.

BSs 301-11 to 301-1v are base stations connected to ASN-GW 201-1.

BSs 301-21 to 301-2w are base stations connected to ASN-GW 201-2.

BSs 301-31 to 301-3x are base stations connected to ASN-GW 201-3.

BSs 301-41 to 301-4y are base stations connected to ASN-GW 201-4.

BSs 301-n1 to 301-nz are base stations connected to ASN-GW 201-n.

An internal configuration of ASN-GWs 201-1 to 201-n shown in FIG. 1 will now be described.

Figure 2:
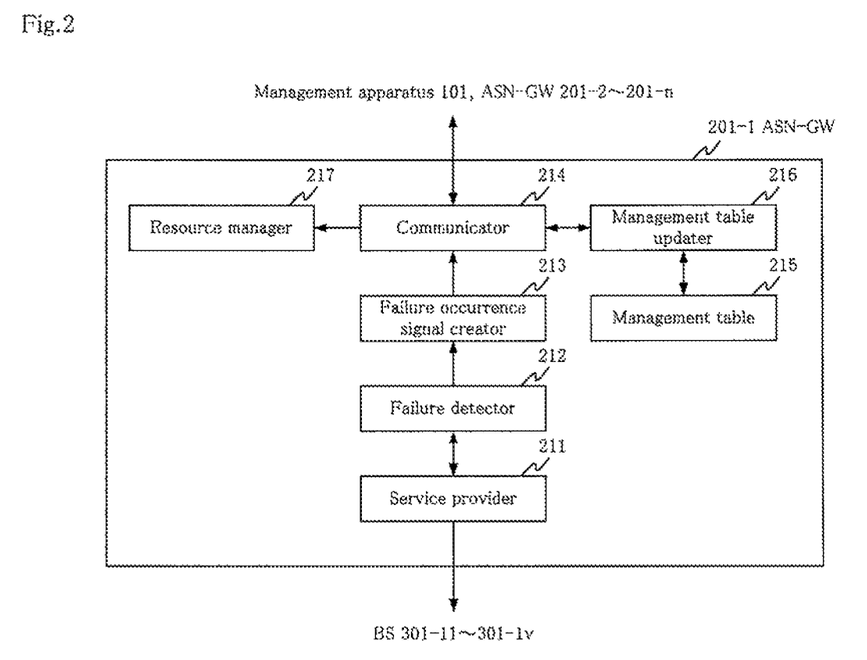
FIG. 2 is a diagram showing an example of an internal configuration of an ASN-GW shown in FIG. 1.

FIG. 2 is a diagram showing an example of an internal configuration of ASN-GW 201-1 shown in FIG. 1.

As shown in FIG. 2, ASN-GW 201-1 shown in FIG. 1 includes service provider 211, failure detector 212, failure occurrence signal creator 213, communicator 214, management table 215, management table updater 216, and resource manager 217.

Service provider 211 provides predetermined services to MSs 401-1 to 401-3 via BSs 301-11 to 301-1v. Services (functions) provided in this case are an Anchor function which serves as a data path enabling the MSs 401-1 to 401-3 to communicate, a Serving function for managing information of the MSs 401-1 to 401-3, and an Authenticator function for performing authentication processing of the MSs 401-1 to 401-3.

Failure detector 212 detects an occurrence of a failure in which service provider 211 is unable to provide services. As for a detection method thereof, a generally used failure detection method may suffice. Otherwise, the detection method may involve detecting whether or not a signal to be transmitted by service provider 211 to MSs 401-1 to 401-3 via BSs 301-11 to 301-1v has been transmitted. Alternatively, the detection method may involve monitoring processes executed by service provider 211 and detecting that at least one of the processes is being suspended. Upon detecting an occurrence of a failure at service provider 211 or, in other words, upon detecting that the provision of services from service provider 211 has been suspended, failure detector 212 notifies failure occurrence signal creator 213 accordingly.

When notified by failure detector 212 that a failure has occurred at service provider 211 or, in other words, that service provider 211 has entered a service suspended state, failure occurrence signal creator 213 creates a failure occurrence signal. The failure occurrence signal need only be respectively recognizable by ASN-GWs 201-1 to 201-n, and a specific signal format thereof will not be stipulated herein. The failure occurrence signal includes ASN-GW identification information uniquely attached so as to be capable of identifying ASN-GW 201-1. Upon creating the failure occurrence signal, failure occurrence signal creator 213 outputs the created failure occurrence signal to communicator 214.

Communicator 214 performs communication to management apparatus 101 and ASN-GWs 201-2 to 201-n. Communicator 214 transmits the failure incident signal outputted from failure occurrence signal creator 213 to other ASN-GWs 201-2 to 201-n. In addition, when MS management information stored in management table 215 is updated due to a mobility operation of the MSs 401-1 to 401-3, the MS management information is transmitted to ASN-GWs 201-2 to 201-n. Furthermore, communicator 214 outputs MS management information transmitted from ASN-GWs 201-2 to 201-n to management table updater 216.

Management table 215 stores MS management information for managing MSs to which ASN-GW 201-1 provides services (MSs managed under ASN-GW 201-1 or MSs for which ASN-GW 201-1 secures resources). In this case, resource refers to a memory area necessary to perform a given process. Resource also refers to a processing area of a CPU.

Figure 3:
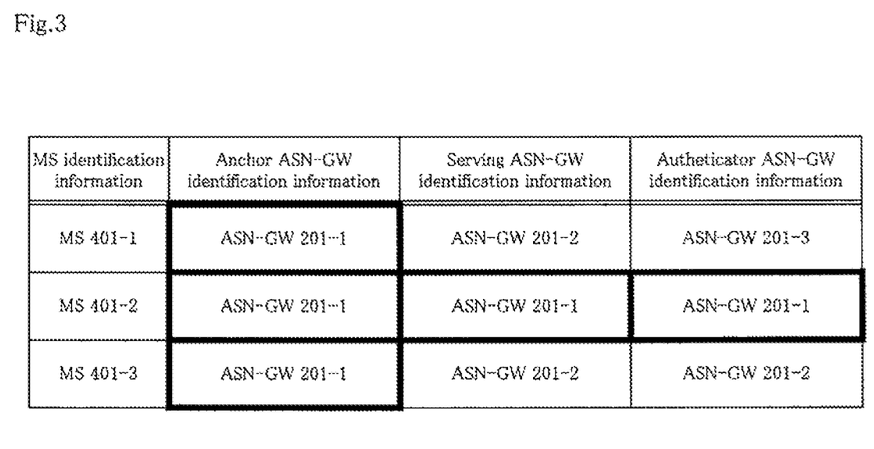
FIG. 3 is a diagram showing an example of MS management information stored in a management table of the ASN-GW shown in FIG. 1.

FIG. 3 is a diagram showing an example of MS management information stored in management table 215 of ASN-GW 201-1 shown in FIG. 1.

As shown in FIG. 3, management table 215 of ASN-GW 201-1 shown in FIG. 1 stores, in association with each other, identification information of MSs to which ASN-GW 201-1 provides services (MSs managed under ASN-GW 201-1), identification information of Anchor ASN-GWs performing the Anchor function which serves as a data path enabling the MSs to communicate, identification information of Serving ASN-GWs performing the Serving function for managing information of the MSs, and identification information of Authenticator ASN-GWs performing the Authenticator function for authenticating the MSs. Among functions shown in FIG. 3, the portion enclosed in the bold line are the functions currently being provided by ASN-GW 201-1.

For example, MS identification information MS 401-1, Anchor ASN-GW identification information ASN-GW 201-1, Serving ASN-GW identification information ASN-GW 201-2, and Authenticator ASN-GW identification information ASN-GW 201-3 are stored in association with each other. This indicates that with respect to MS 401-1, ASN-GW 201-1 performs the Anchor function, ASN-GW 201-2 performs the Serving function, and ASN-GW 201-3 performs the Authenticator function. In addition, MS identification information MS 401-2, Anchor ASN-GW identification information ASN-GW 201-1, Serving ASN-GW identification information ASN-GW 201-1, and Authenticator ASN-GW identification information ASN-GW 201-1 are stored in association with each other. This indicates that with respect to MS 401-2, ASN-GW 201-1 performs the Anchor function, the Serving function and the Authenticator function. Furthermore, MS identification information MS 401-3, Anchor ASN-GW identification information ASN-GW 201-1, Serving ASN-GW identification information ASN-GW 201-2, and Authenticator ASN-GW identification information ASN-GW 201-2 are stored in association with each other. This indicates that with respect to MS 401-3, ASN-GW 201-1 performs the Anchor function while ASN-GW 201-2 performs the Serving function and the Authenticator function.

The MS management information enables ASN-GW 201-1 to recognize (manage) which ASN-GWs 202-2 to 202-n are providing functions not provided by ASN-GW 201-1 with respect to MSs to which ASN-GW 201-1 provides services (MSs under management of ASN-GW 201-1) (in FIG. 3, MSs 401-1 to 401-3).

Figure 4:
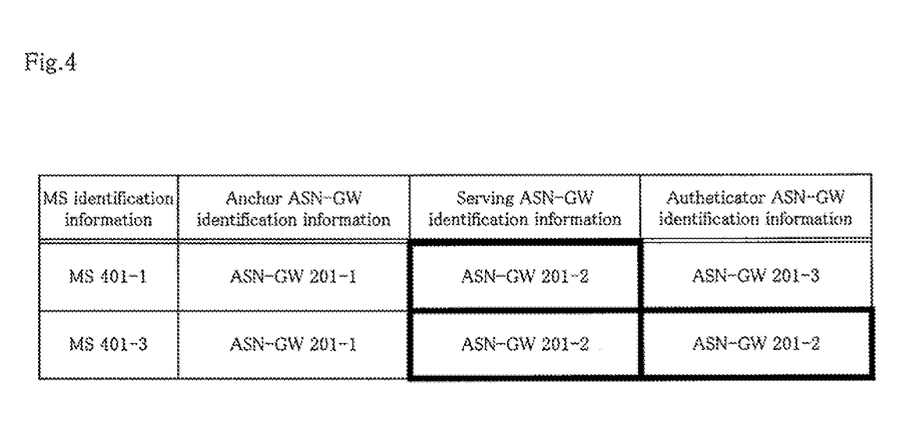
FIG. 4 is a diagram showing an example of MS management information stored in a management table of the ASN-GW shown in FIG. 1.

FIG. 4 is a diagram showing an example of MS management information stored in management table 215 of ASN-GW 201-2 shown in FIG. 1.

As shown in FIG. 4, management table 215 of ASN-GW 201-2 shown in FIG. 1 stores, in association with each other, identification information of MSs to which ASN-GW 201-2 provides services (MSs managed under ASN-GW 201-2), identification information of Anchor ASN-GWs performing the Anchor function which serves as a data path enabling the MSs to communicate, identification information of Serving ASN-GWs performing the Serving function for managing information of the MSs, and identification information of Authenticator ASN-GWs performing the Authenticator function for authenticating the MSs. Among functions shown in FIG. 4, the portion enclosed in the bold line are the functions currently being provided by ASN-GW 201-2.

For example, MS identification information MS 401-1, Anchor ASN-GW identification information ASN-GW 201-1, Serving ASN-GW identification information ASN-GW 201-2, and Authenticator ASN-GW identification information ASN-GW 201-3 are stored in association with each other. This indicates that with respect to MS 401-1, ASN-GW 201-1 performs the Anchor function, ASN-GW 201-2 performs the Serving function, and ASN-GW 201-3 performs the Authenticator function. In addition, MS identification information MS 401-3, Anchor ASN-GW identification information ASN-GW 201-1, Serving ASN-GW identification information ASN-GW 201-2, and Authenticator ASN-GW identification information ASN-GW 201-2 are stored in association with each other. This indicates that with respect to MS 401-3, ASN-GW 201-1 performs the Anchor function while ASN-GW 201-2 performs the Serving function and the Authenticator function.

The MS management information enables ASN-GW 201-2 to recognize (manage) which ASN-GWs 201-1, 202-3 to 202-n are providing functions not provided by ASN-GW 201-2 with respect to MSs to which ASN-GW 201-2 provides services (MSs under management of ASN-GW 201-2) (in FIG. 4, MSs 401-1 and 401-3).

Figure 5:
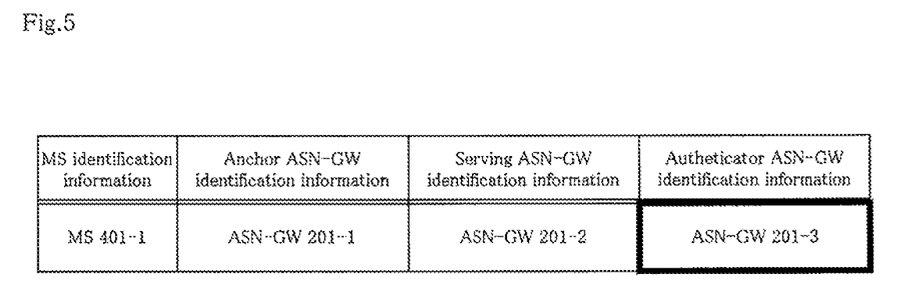
FIG. 5 is a diagram showing an example of MS management information stored in a management table of the ASN-GW shown in FIG. 1.

FIG. 5 is a diagram showing an example of MS management information stored in management table 215 of ASN-GW 201-3 shown in FIG. 1.

As shown in FIG. 5, management table 215 of ASN-GW 201-3 shown in FIG. 1 stores, in association with each other, identification information of an MS to which ASN-GW 201-3 provides services (an MS managed under ASN-GW 201-3), identification information of an Anchor ASN-GW performing the Anchor function which serves as a data path enabling the MS to communicate, identification information of a Serving ASN-GW performing the Serving function for managing information of the MS, and identification information of an Authenticator ASN-GW performing the Authenticator function for authenticating the MS. Among functions shown in FIG. 5, the portion enclosed in the bold line is the function currently being provided by ASN-GW 201-3.

For example, MS identification information MS 401-1, Anchor ASN-GW identification information ASN-GW 201-1, Serving ASN-GW identification information ASN-GW 201-2, and Authenticator ASN-GW identification information ASN-GW 201-3 are stored in association with each other. This indicates that with respect to MS 401-1, ASN-GW 201-1 performs the Anchor function, ASN-GW 201-2 performs the Serving function, and ASN-GW 201-3 performs the Authenticator function.

The MS management information enables ASN-GW 201-3 to recognize (manage) which ASN-GWs 201-1, 201-2, 202-4 to 202-n are providing functions not provided by ASN-GW 201-3 with respect to an MS to which ASN-GW 201-3 provides services (the MS under management of ASN-GW 201-3) (in FIG. 5, MS 401-1).

The MS management information shown in FIGS. 3 to 5 is read from respective management tables 215 by management table updaters 216 at a preset timing to be mutually notified among ASN-GWs 201-1 to 201-n when the functions (roles) respectively performed by ASN-GWs 201-1 to 201-n change, such as after a handover (R4 HO) across different ASN-GWs is performed by MSs 401-1 to 401-3 or after reauthentication subsequent to R4 HO is performed. In this case, the notification destination may either be limited to the ASN-GWs stored in management table 215 of the notification source ASN-GW or may include all ASN-GWs 201-1 to 201-n as management targets of management apparatus 101.

Management table updater 216 updates MS management information stored in management table 215 as necessary. For example, when MS management information is transmitted from ASN-GWs 201-2 to 201-n via communicator 214, management table 215 is updated based on the transmitted MS management information. In addition, management table 215 is updated when functions provided to MSs 401-1 to 401-3 change due to a mobility operation of MSs 401-1 to 401-3.

Resource manager 217 manages resources of MSs 401-1 to 401-3 to which ASN-GW 201-1 provides services.

The internal configurations of ASN-GWs 202-2 to 201-n shown in FIG. 1 are the same as the internal configuration of ASN-GW 201-1 described above.

A state transition of ASN-GWs 201-1 to 201-n which perform the Anchor function, the Serving function and the Authenticator function with respect to a single MS (for example, MS 401-1) will now be described.

Figure 6:
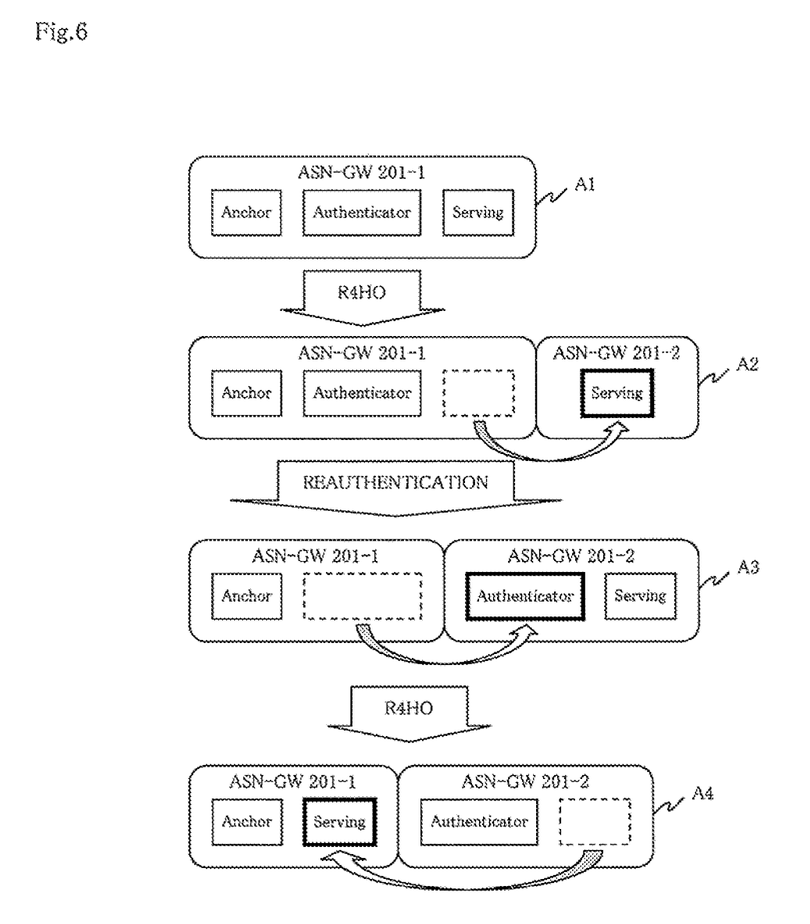
FIG. 6 is a diagram showing a first example of a state transition of an ASN-GW that performs an Anchor function, a Serving function and an Authentication function with respect to a single MS.

FIG. 6 is a diagram showing a first example of a state transition of ASN-GWs 201-1 to 201-*n* that perform the Anchor function, the Serving function and the Authentication function with respect to a single MS.

First, when MS 401-1 exists under ASN-GW 201-1, ASN-GW 201-1 performs the Anchor function, the Serving function and the Authentication function with respect to MS 401-1 (state A1). In other words, in state A1, ASN-GW 201-1 becomes the Anchor ASN-GW, the Serving ASN-GW and the Authentication ASN-GW with respect to MS 401-1.

At this point, when an R4 HO occurs as a result of MS 401-1 moving from under ASN-GW 201-1 to under ASN-GW 201-2, the Serving function with respect to MS 401-1 moves from ASN-GW 201-1 to ASN-GW 201-2 (state A2). In other words, in state A2, ASN-GW 201-1 becomes the Anchor ASN-GW and the Authenticator ASN-GW with respect to MS 401-1. In addition, ASN-GW 201-2 becomes the Serving ASN-GW.

Next, after reauthentication of MS 401-1 is performed, the Authenticator function with respect to MS 401-1 moves from ASN-GW 201-1 to ASN-GW 201-2 (state A3). In other words, in state A3, ASN-GW 201-1 becomes the Anchor ASN-GW with respect to MS 401-1. In addition, ASN-GW 201-2 becomes the Authenticator ASN-GW and the Serving ASN-GW.

Subsequently, when a further R4 HO occurs as a result of MS 401-1 moving from under ASN-GW 201-2 to under ASN-GW 201-1, the Serving function with respect to MS 401-1 moves from ASN-GW 201-2 to ASN-GW 201-1 (state A4). In other words, in state A4, ASN-GW 201-1 becomes the Anchor ASN-GW and the Serving ASN-GW with respect to MS 401-1. In addition, ASN-GW 201-2 becomes the Authenticator ASN-GW.

Figure 7:
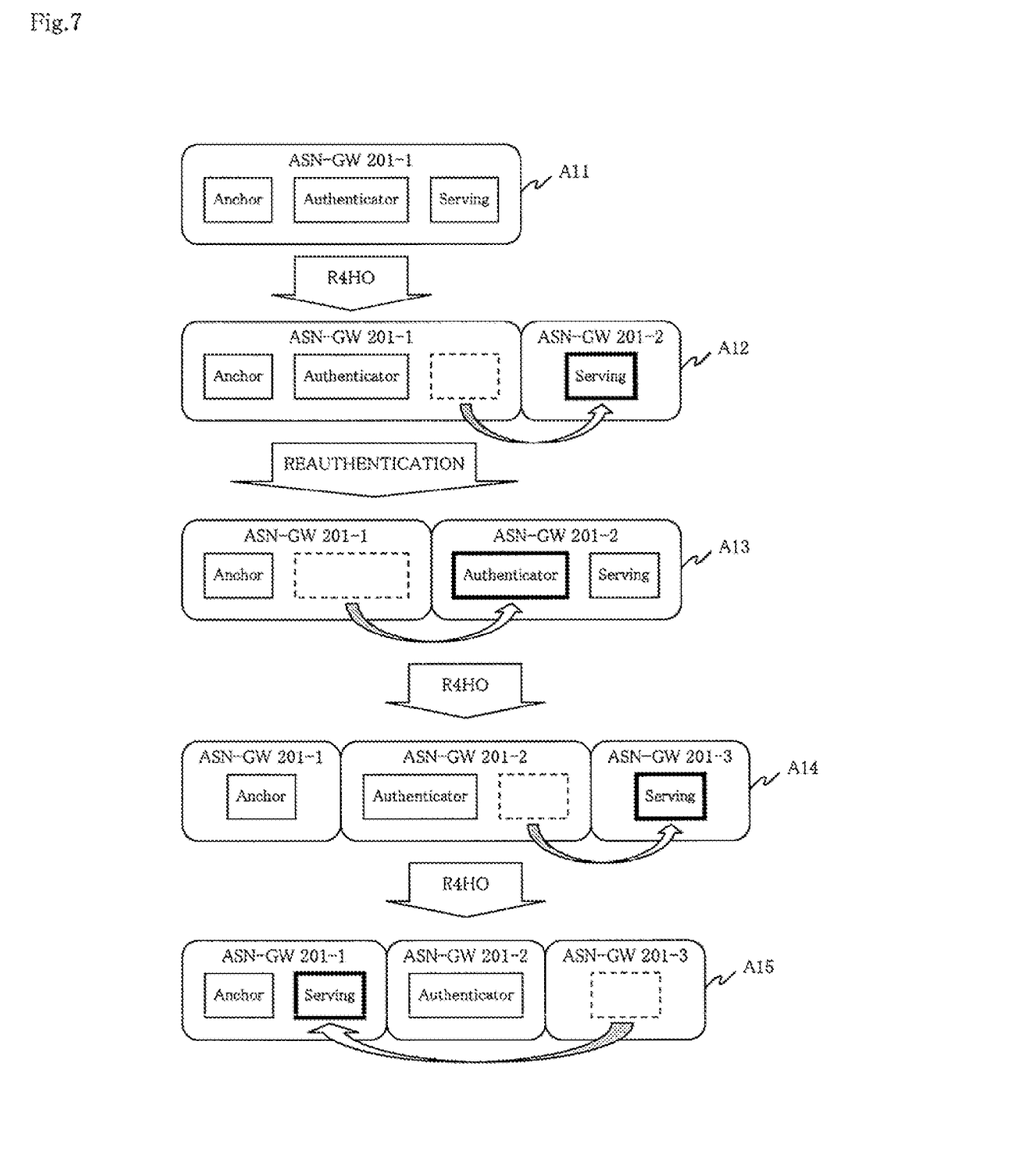
FIG. 7 is a diagram showing a second example of a state transition of an ASN-GW that performs an Anchor function, a Serving function and an Authentication function with respect to a single MS.

FIG. 7 is a diagram showing a second example of a state transition of ASN-GWs 201-1 to 201-*n* that perform the Anchor function, the Serving function and the Authentication function with respect to a single MS.

First, when MS 401-1 exists under ASN-GW 201-1, ASN-GW 201-1 performs the Anchor function, the Serving function and the Authentication function with respect to MS 401-1 (state A11). In other words, in state A11, ASN-GW 201-1 becomes the Anchor ASN-GW, the Serving ASN-GW and the Authentication ASN-GW with respect to MS 401-1.

At this point, when an R4 HO occurs as a result of MS 401-1 moving from under ASN-GW 201-1 to under ASN-GW 201-2, the Serving function with respect to MS 401-1 moves from ASN-GW 201-1 to ASN-GW 201-2 (state A12). In other words, in state A12, ASN-GW 201-1 becomes the Anchor ASN-GW and the Authenticator ASN-GW with respect to MS 401-1. In addition, ASN-GW 201-2 becomes the Serving ASN-GW.

Next, after reauthentication of MS 401-1 is performed, the Authenticator function with respect to MS 401-1 moves from ASN-GW 201-1 to ASN-GW 201-2 (state A13). In other words, in state A13, ASN-GW 201-1 becomes the Anchor ASN-GW with respect to MS 401-1. In addition, ASN-GW 201-2 becomes the Authenticator ASN-GW and the Serving ASN-GW.

Subsequently, when an R4 HO occurs as a result of MS 401-1 moving from under ASN-GW 201-2 to under ASN-GW 201-3, the Serving function with respect to MS 401-1 moves from ASN-GW 201-2 to ASN-GW 201-3 (state A14). In other words, in state A14, ASN-GW 201-1 becomes the Anchor ASN-GW with respect to MS 401-1. In addition, ASN-GW 201-2 becomes the Authenticator ASN-GW. Moreover, ASN-GW 201-3 becomes the Serving ASN-GW.

Furthermore, when an R4 HO occurs as a result of MS 401-1 moving from under ASN-GW 201-3 to under ASN-GW 201-1, the Serving function with respect to MS 401-1 moves from ASN-GW 201-3 to ASN-GW 201-1 (state A15). In other words, in state A15, ASN-GW 201-1 becomes the Anchor ASN-GW and the Serving ASN-GW with respect to MS 401-1. In addition, ASN-GW 201-2 becomes the Authenticator ASN-GW.

Figure 8:
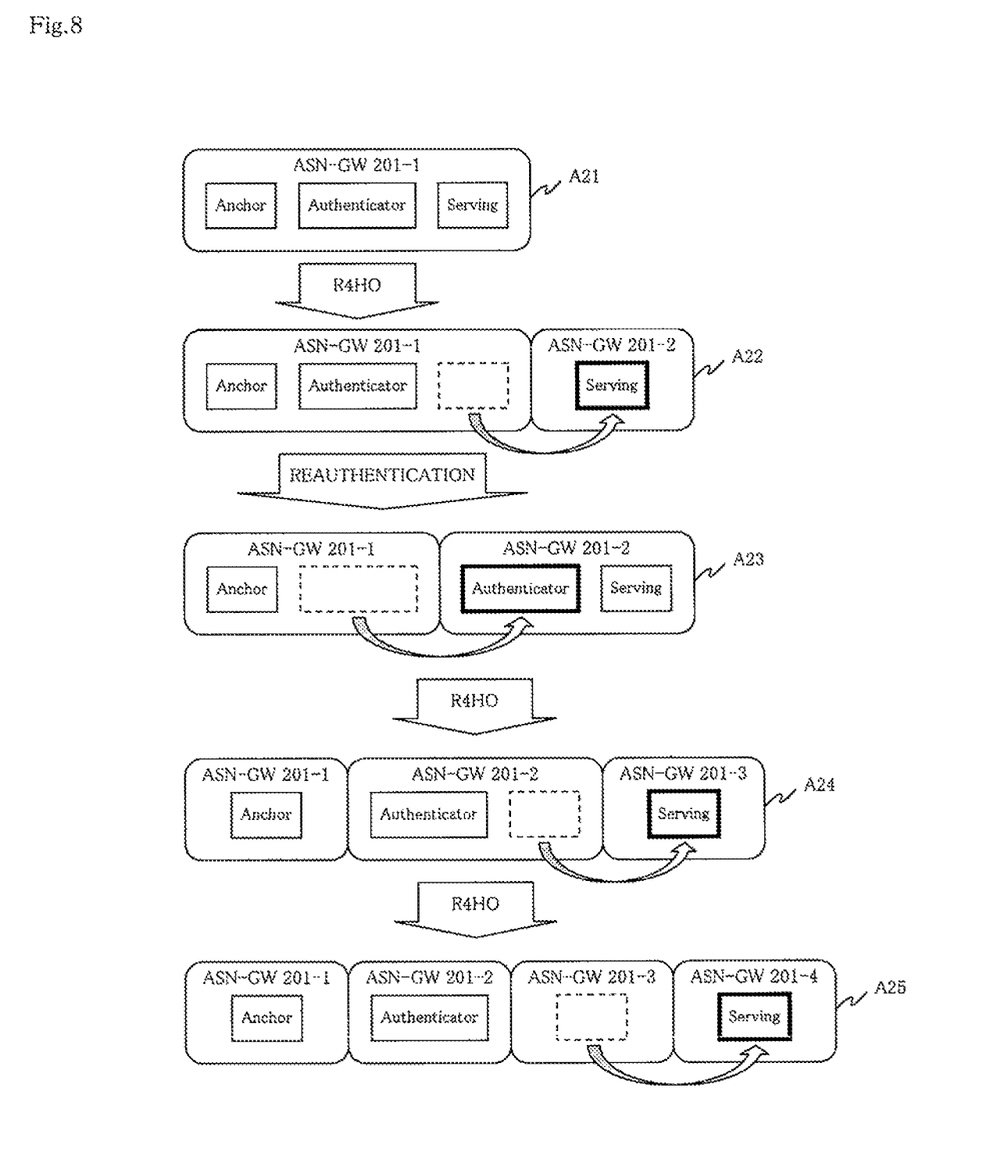
FIG. 8 is a diagram showing a third example of a state transition of an ASN-GW that performs an Anchor function, a Serving function and an Authentication function with respect to a single MS.

FIG. 8 is a diagram showing a third example of a state transition of ASN-GWs 201-1 to 201-*n* that perform the Anchor function, the Serving function and the Authentication function with respect to a single MS.

First, when MS 401-1 exists under ASN-GW 201-1, ASN-GW 201-1 performs the Anchor function, the Serving function and the Authentication function with respect to MS 401-1 (state A21). In other words, in state A21, ASN-GW 201-1 becomes the Anchor ASN-GW, the Serving ASN-GW and the Authentication ASN-GW with respect to MS 401-1.

At this point, when an R4 HO occurs as a result of MS 401-1 moving from under ASN-GW 201-1 to under ASN-GW 201-2, the Serving function with respect to MS 401-1 moves from ASN-GW 201-1 to ASN-GW 201-2 (state A22). In other words, in state A22, ASN-GW 201-1 becomes the Anchor ASN-GW and the Authenticator ASN-GW with respect to MS 401-1. In addition, ASN-GW 201-2 becomes the Serving ASN-GW.

Next, after reauthentication of MS 401-1 is performed, the Authenticator function with respect to MS 401-1 moves from ASN-GW 201-1 to ASN-GW 201-2 (state A23). In other words, in state A23, ASN-GW 201-1 becomes the Anchor ASN-GW with respect to MS 401-1. In addition, ASN-GW 201-2 becomes the Authenticator ASN-GW and the Serving ASN-GW.

Subsequently, when an R4 HO occurs as a result of MS 401-1 moving from under ASN-GW 201-2 to under ASN-GW 201-3, the Serving function with respect to MS 401-1 moves from ASN-GW 201-2 to ASN-GW 201-3 (state A24). In other words, in state A24, ASN-GW 201-1 becomes the Anchor ASN-GW with respect to MS 401-1. In addition, ASN-GW 201-2 becomes the Authenticator ASN-GW. Moreover, ASN-GW 201-3 becomes the Serving ASN-GW.

Furthermore, when an R4 HO occurs as a result of MS 401-1 moving from under ASN-GW 201-3 to under ASN-GW 201-4, the Serving function with respect to MS 401-1 moves from ASN-GW 201-3 to ASN-GW 201-4 (state A25). In other words, in state A25, ASN-GW 201-1 becomes the Anchor ASN-GW with respect to MS 401-1. In addition, ASN-GW 201-2 becomes the Authenticator ASN-GW. Moreover, ASN-GW 201-4 becomes the Serving ASN-GW.

Figure 9:
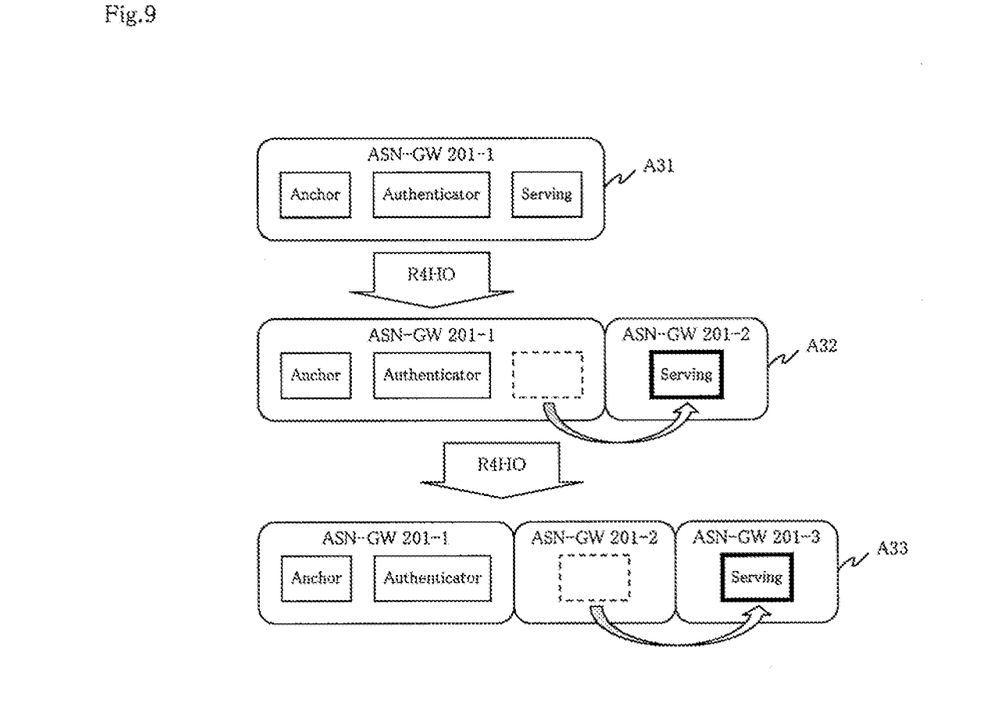
FIG. 9 is a diagram showing a fourth example of a state transition of an ASN-GW that performs an Anchor function, a Serving function and an Authentication function with respect to a single MS.

FIG. 9 is a diagram showing a fourth example of a state transition of ASN-GWs 201-1 to 201-*n* that perform the Anchor function, the Serving function and the Authentication function with respect to a single MS.

First, when MS 401-1 exists under ASN-GW 201-1, ASN-GW 201-1 performs the Anchor function, the Serving function and the Authentication function with respect to MS 401-1 (state A31). In other words, in state A31, ASN-GW 201-1 becomes the Anchor ASN-GW, the Serving ASN-GW and the Authentication ASN-GW with respect to MS 401-1.

At this point, when an R4 HO occurs as a result of MS 401-1 moving from under ASN-GW 201-1 to under ASN-GW 201-2, the Serving function with respect to MS 401-1 moves from ASN-GW 201-1 to ASN-GW 201-2 (state A32). In other words, in state A32, ASN-GW 201-1 becomes the Anchor ASN-GW and the Authenticator ASN-GW with respect to MS 401-1. In addition, ASN-GW 201-2 becomes the Serving ASN-GW.

Subsequently, when a further R4 HO occurs as a result of MS 401-1 moving from under ASN-GW 201-2 to under ASN-GW 201-3, the Serving function with respect to MS 401-1 moves from ASN-GW 201-2 to ASN-GW 201-3 (state A33). In other words, in state A33, ASN-GW 201-1 becomes the Anchor ASN-GW and the Authenticator ASN-GW with respect to MS 401-1. Moreover, ASN-GW 201-3 becomes the Serving ASN-GW.

As described above, the logically-divided Anchor ASN-GW, Serving ASN-GW and Authenticator ASN-GW are distributed to physically different ASN-GWs in accordance with R4 HOs and reauthentications which occur due to movement of MS 401-1.

Failure occurrence notification processing by ASN-GWs 201-1 to 201-n shown in FIG. 1 will now be described. For now, failure occurrence notification processing by ASN-GW 201-2 will be described as an example.

Figure 10:
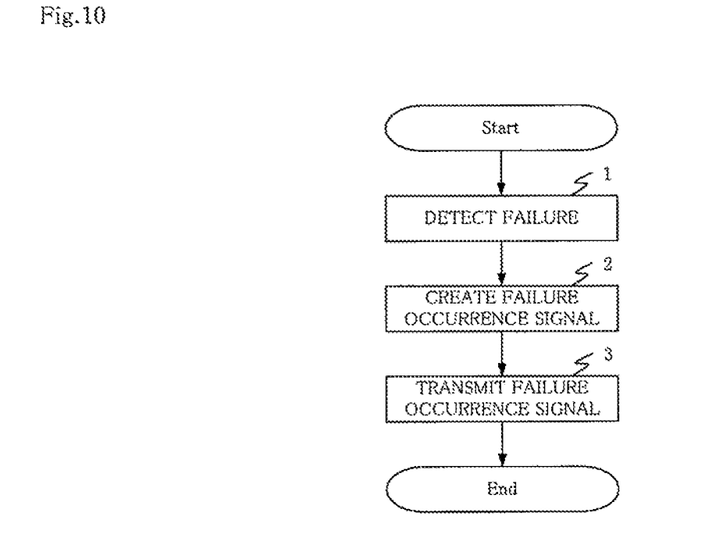
FIG. 10 is a flowchart describing an example of failure occurrence notification processing by the ASN-GW shown in FIG. 1.

FIG. 10 is a flowchart describing an example of failure occurrence notification processing by ASN-GW 201-2 shown in FIG. 1.

First, when failure detector 212 detects that a failure (service suspension) in which service cannot be provided by service provider 211 has occurred in step 1, an output to that effect is made from failure detector 212 to failure occurrence signal creator 213.

Failure occurrence signal creator 213 creates a failure occurrence signal indicating that a failure has occurred at service provider 211 in step 2. At this point, the failure occurrence signal includes ASN-GW identification information of ASN-GW 201-2.

The created failure occurrence signal is transmitted from failure occurrence signal creator 213 to ASN-GWs 201-1, 201-3 to 201-n via communicator 214 in step 3.

A resource management method of ASN-GWs 201-1 to 201-n shown in FIG. 1 will now be described.

Figure 11:
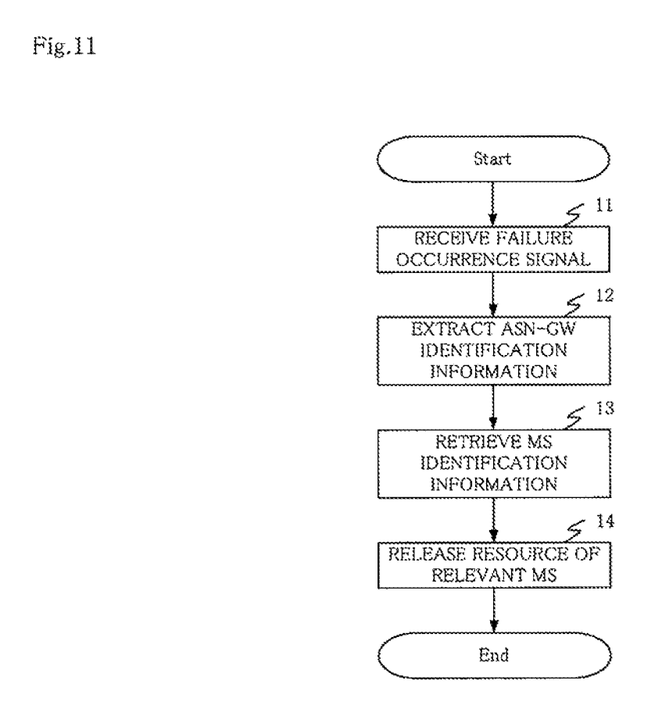
FIG. 11 is a flowchart describing an example of a resource management method used by the ASN-GW shown in FIG. 1.

FIG. 11 is a flowchart describing an example of a resource management method used by ASN-GWs 201-1 to 201-n shown in FIG. 1. For now, processing by ASN-GW 201-1 upon occurrence of a failure at ASN-GW 201-2 will be described as an example. Moreover, a failure occurrence signal for notifying that a failure has occurred at ASN-GWs 201-1 to 201-n include identification information of ASN-GWs 201-1 to 201-n as notification sources.

First, when a failure occurrence signal is received by communicator 214 of ASN-GW 201-1 in step 11, ASN-GW identification information (in this case, identification information of ASN-GW 201-2) is extracted by management table updater 216 from the received failure occurrence signal in step 12.

Next, by management table updater 216, an MS (MS identification information) under ASN-GW 201-2 is retrieved from management table 215 based on the identification information of ASN-GW 201-2 in step 13.

In the case of management table 215 shown in FIG. 3, since the MSs under ASN-GW 201-2 are MS 401-1 and MS 401-3, MS 401-1 and MS 401-3 are retrieved.

Consequently, the resources of MSs corresponding to the retrieved MS identification information are released by resource manager 217 in step 14. In this case, the resources of MS 401-1 and MS 401-3 are released. Furthermore, MS management information corresponding to MS 401-1 and MS 401-3 is deleted from management table 215 by management table updater 216.

The processing by ASN-GWs 201-1 to 201-n described above may be arranged to be performed by a logical circuit fabricated in accordance with the intended use. In addition, a program describing processing contents as procedures may be stored in a readable storage medium by ASN-GWs 201-1 to 201-n, whereby the program stored in the storage medium is executed by having ASN-GWs 201-1 to 201-n read the program. A storage medium readable by ASN-GWs 201-1 to 201-n includes a relocatable storage medium such as a floppy disk (registered trademark), a magnet-optical disk, a DVD or a CD, a memory such as a ROM or a RAM built into ASN-GWs 201-1 to 201-n, an HDD, or the like. The program stored in the storage medium is read by a CPU (not shown) in ASN-GWs 201-1 to 201-n, whereby processing similar to that described above is performed under the control of the CPU. In this case, the CPU operates as a computer that executes the program read from a storage medium storing the program.

As described above, when an MS receiving services from an ASN-GW is no longer able to receive the services due to an occurrence of a failure at the ASN-GW, the resources of the MS inside ASN-GWs other than the ASN-GW and which provide other services to the MS is released. Consequently, unnecessarily secured resources can be released and the risk of hardware resource depletion can be reduced. In addition, consistency in management information in the respective ASN-GWs can be ensured during re-entry of an MS into a WiMAX network.

The present invention has been described above with reference to the exemplary embodiment. However, the present invention is not limited to the above exemplary embodiment. Various modifications that those skilled in the art can understand may be made within the scope of the present invention to the configuration and details of the present invention.

This application is the National Phase of PCT/JP2009/056042, filed Mar. 26, 2009, which claims the benefit of priority from Japanese Patent Application No. 2008-103550, filed on Apr. 11, 2008, the entire contents of which are incorporated herein by reference.

The invention claimed is:

1. A communication system including a mobile communication terminal provided with a wireless communication function and a plurality of service providing apparatuses providing a plurality of services to the mobile communication terminal via a wireless base station, wherein
    the service providing apparatus, upon entering a suspended state of the services, transmits a signal indicating that a suspended state of the services has been entered to service providing apparatuses other than said service providing apparatus, and when the signal is received, releases resources of the mobile communication terminal to which the service providing apparatus having transmitted the signal has provided services, and
    the service providing apparatus comprises:
    a management table that stores MS management information in which MS identification information attached to a mobile communication terminal to which said service providing apparatus is providing services and ASN-GW (Access Service Network Gateway) identification information attached to the service providing apparatuses respectively providing services to the mobile communication information are associated to each other;
    a service provider providing the services;
    a failure detector that detects that the service provider has entered a service suspended state;
    a failure occurrence signal creator that creates, when a transition to a service suspended state is detected by the failure detector, a failure occurrence signal including ASN-GW identification information attached to said service providing apparatus and which indicates that the failure has occurred;

a communicator that transmits the failure occurrence signal to service providing apparatuses other than said service providing apparatus among the plurality of service providing apparatuses;

a management table updater that extracts, when receiving the failure occurrence signal from service providing apparatuses other than said service providing apparatus among the plurality of service providing apparatuses, ASN-GW identification information from the received failure occurrence signal and, based on the extracted ASN-GW identification information, retrieves MS management information associated with the ASN-GW identification information from the management table; and a resource manager that releases resources of a mobile communication terminal to which the retrieved MS identification information is attached.

2. The communication system according to claim 1, wherein
the service provider provides the mobile communication terminal with a service to become a data path for the mobile communication terminal to communicate, a service for managing information of the mobile communication terminal, and a service for performing authentication processing of the mobile communication terminal.

3. The communication system according to claim 1, wherein
the management table updater reads the MS management information from the management table at a predetermined timing and transmits the same to service providing apparatuses other than said service providing apparatus via the communicator, and when the MS management information is transmitted from service providing apparatuses other than said service providing apparatus, updates the management table based on the transmitted MS management information.

4. A service providing apparatus that, in plurality, provides a plurality of services to a mobile communication terminal provided with a wireless communication function, wherein
the service providing apparatus transmits, upon entering a suspended state of the service, a signal indicating that a suspended state of the services has been entered to service providing apparatuses other than said service providing apparatus, and when the signal is received, releases resources of the mobile communication terminal to which the service providing apparatus having transmitted the signal has provided the services, and
the service providing apparatus comprises:
a management table that stores MS management information in which MS identification information attached to a mobile communication terminal to which said service providing apparatus is providing services and ASN-GW identification information attached to the service providing apparatuses respectively providing services to the mobile communication information are associated to each other;
a service provider providing the services;
a failure detector that detects that the service provider has entered a service suspended state;
a failure occurrence signal creator that creates, when a transition to a service suspended state is detected is detected by the failure detector, a failure occurrence signal including ASN-GW identification information attached to said service providing apparatus and which indicates that the failure has occurred;

a communicator that transmits the failure occurrence signal to other service providing apparatuses connected to said service providing apparatus;

a management table updater that extracts, when receiving the failure occurrence signal from the other service providing apparatuses, ASN-GW identification information from the received failure occurrence signal and, based on the extracted ASN-GW identification information, retrieves MS management information associated with the ASN-GW identification information from the management table; and a resource manager that releases resources of a mobile communication terminal to which the retrieved MS identification information is attached.

5. The service providing apparatus according to claim 4, wherein
the service provider provides the mobile communication terminal with a service to become a data path for the mobile communication terminal to communicate, a service for managing information of the mobile communication terminal, and a service for performing authentication processing of the mobile communication terminal.

6. The service providing apparatus according to claim 4, wherein
the management table updater reads the MS management information from the management table at a predetermined timing and transmits the same to the other service providing apparatuses via the communicator, and when the MS management information is transmitted from the other service providing apparatuses, updates the management table based on the transmitted MS management information.

7. A resource management method of a service providing apparatus which, in plurality, provides a plurality of services to a mobile communication terminal provided with a wireless communication function, for managing resources of the mobile communication terminal, the resource management method comprising steps for:
transmitting, upon entering a suspended state of the services, a signal indicating that a suspended state of the services has been entered to service providing apparatuses other than said service providing apparatus;
releasing, when the signal is received, resources of the mobile communication terminal to which the services have been provided by the service providing apparatus having transmitted the signal;
storing MS management information, in which MS identification information attached to a mobile communication terminal to which said service providing apparatus is providing services and ASN-GW identification information attached to the service providing apparatuses respectively providing services to the mobile communication information are associated to each other, in a management table included in said service providing apparatus;
providing the services;
detecting that the services have entered a service suspended state;
creating, when a transition to a service suspended state is detected, a failure occurrence signal including ASN-GW identification information attached to said service providing apparatus and which indicates that the failure has occurred;

transmitting the failure occurrence signal to other service providing apparatuses connected to said service providing apparatus;

extracting, when receiving the failure occurrence signal from the other service providing apparatuses, ASN-GW identification information from the received failure occurrence signal;

retrieving MS management information associated with the ASN-GW identification information from the management table based on the extracted ASN-GW identification information; and releasing resources of a mobile communication terminal to which the retrieved MS identification information is attached.

8. The resource management method according to claim 7, comprising steps for:

reading the MS management information from the management table at a predetermined timing;

transmitting the read MS management information to the other service providing apparatuses; and updating, when the MS management information is transmitted from the other service providing apparatuses, the management table based on the transmitted MS management information.

* * * * *